(12) United States Patent
Philips (10) Patent No.: US 7,764,795 B2
(45) Date of Patent: Jul. 27, 2010

(54) KEY-EXCHANGE PROTOCOL USING A PASSWORD-DERIVED PRIME

(75) Inventor: Andrew B. Philips, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 995 days.

(21) Appl. No.: 10/970,316

(22) Filed: Oct. 20, 2004

(65) Prior Publication Data
US 2006/0085643 A1    Apr. 20, 2006

(51) Int. Cl.
H04L 9/00    (2006.01)
(52) U.S. Cl. .................................. 380/283; 713/171
(58) Field of Classification Search .......... 713/171, 713/176; 380/283; 726/2, 26
See application file for complete search history.

(56) References Cited

U.S. PATENT DOCUMENTS

| | | | | |
|---|---|---|---|---|
| 5,748,888 | A * | 5/1998 | Angelo et al. .................. 726/26 |
| 6,192,474 | B1* | 2/2001 | Patel et al. .................... 713/171 |
| 7,073,068 | B2* | 7/2006 | Jakobsson et al. ............ 713/184 |
| 7,076,656 | B2* | 7/2006 | MacKenzie ................... 713/171 |
| 2002/0194478 | A1* | 12/2002 | MacKenzie ................... 713/171 |
| 2003/0221102 | A1* | 11/2003 | Jakobsson et al. ............ 713/171 |
| 2003/0229788 | A1* | 12/2003 | Jakobsson et al. ............ 713/171 |
| 2005/0149747 | A1* | 7/2005 | Wesinger et al. ............. 713/200 |
| 2006/0206943 | A1* | 9/2006 | Ellison et al. ................. 726/26 |
| 2006/0253895 | A1* | 11/2006 | Brandofino et al. ............ 726/2 |
| 2006/0272025 | A1* | 11/2006 | Mononen ...................... 726/26 |
| 2007/0143857 | A1* | 6/2007 | Ansari ........................... 726/26 |
| 2007/0266254 | A1* | 11/2007 | von Schlegell et al. ...... 713/176 |
| 2007/0277036 | A1* | 11/2007 | Chamberlain et al. ........ 713/171 |
| 2007/0277040 | A1* | 11/2007 | Scheidt et al. ................ 713/176 |

(Continued)

FOREIGN PATENT DOCUMENTS

SE    EP1480374    * 11/2004    .................. 713/176

OTHER PUBLICATIONS

Kyoung-sook Jung, Password-Based Independent Authenticatio and Key Exchange Protocol, Dec. 15, 2003, ICICS-PCM 2003, 3C6.1.*
Sangjoon Park, Efficient Password-Authenticated Key Exchange Based on RSA, Feb. 7, 2007, Springer Berlin, 4377/2006, 440-746.*

(Continued)

*Primary Examiner*—Kambiz Zand
*Assistant Examiner*—Monjour Rahim
(74) *Attorney, Agent, or Firm*—Park, Vaughan & Fleming LLP (57) ABSTRACT

One embodiment of the present invention provides a system that uses a password-derived prime number to facilitate a secure key exchange between a client and a server across a network. During operation, the client receives a password from a user. Next, the client uses the password to determine a prime number P associated with the password. The client then uses the prime number P to determine a generator g associated with P. The client uses this prime number to calculate $X=g^x$ mod P, wherein x is a random number generated by the client. Next, the client sends X to the server. The client also receives $Y=g^y$ mod P from the server, wherein y is a random number generated by the server. The client then computes a secret key $K_s=Y^x$ mod p at the client, which the server can similarly obtain by computing $K_s=X^y$ mod p. In this way, the client and the server can both obtain the same secret key $K_s$ through insecure communications over the network.

15 Claims, 5 Drawing Sheets

U.S. PATENT DOCUMENTS

2007/0283444 A1* 12/2007 Jang ............................ 726/26
2007/0294745 A1* 12/2007 Tan et al. ....................... 726/2
2007/0300287 A1* 12/2007 Wynne et al. ................... 726/2

OTHER PUBLICATIONS

Radia Perlman; PDM: A New Strong Password-Based Protocol; Aug. 13-17, 2001; The USENIX Association; pp. 1-10.*

* cited by examiner

KEY-EXCHANGE PROTOCOL USING A PASSWORD-DERIVED PRIME

BACKGROUND

1. Field of the Invention

The present invention relates to techniques for providing network security. More specifically, the present invention relates to a method and an apparatus that uses a password-derived prime number to facilitate a secure key exchange between devices on a network.

2. Related Art

The advent of computer networks has led to an explosion in the development of applications, such as client-server applications, which operate by transferring information between computational devices across computer networks.

One problem with sending information across computer networks is that it is hard to ensure that sensitive information is kept confidential. This is because a message containing sensitive information can potentially traverse many different computer networks and many different computer systems before it arrives at its ultimate destination. An adversary can potentially intercept a message at any of these intermediate points along the way.

One way to remedy this problem is to establish a "secure communication session" between computer systems. A secure communication session typically uses one or more shared secret keys to encrypt and decrypt information that is transferred between the computer systems.

Figure 1:
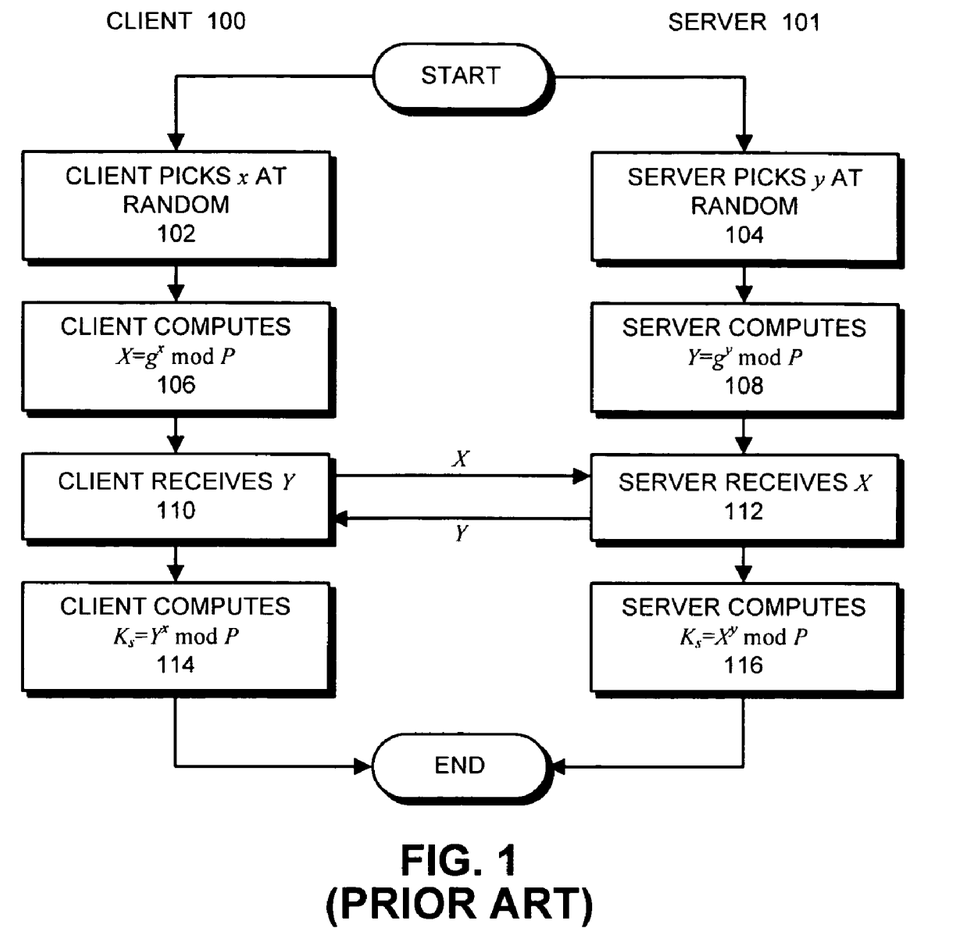
FIG. 1 presents a flow chart illustrating a Diffie-Hellman key-exchange protocol.

One commonly used technique for establishing a secure communication session involves an anonymous Diffie-Hellman exchange. A Diffie-Hellman exchange allows two computer systems to agree on a secret shared key by exchanging messages across an insecure network. Referring the FIG. 1, a Diffie-Hellman exchange begins by allowing two parties, such as a client 100 and a server 101, to pick random numbers x and y, respectively (steps 102 and 104). Client 100 then computes $X=g^x$ mod P, where P is a large prime number and g is number less than P with certain restrictions that are not important for a basic understanding of the method (step 106). (Note that both g and P can be publicly known.) Similarly, server 101 computes $Y=g^y$ mod P (step 108). Next, client 100 and server 101 exchange X and Y (steps 110 and 112). Client 100 then computes the shared secret key as $K_s=Y^x$ mod P (step 114). Server 101 similarly computes the shared secret key as $K_s=X^y$ mod P (step 116). Note that $X^y$ mod $P=(g^x)^y=g^{xy}=(g^y)^x=Y^x$ mod P, which means that client 100 and server 101 have produced the same shared secret key, $K_s$. Furthermore, note that it is computationally infeasible for an adversary to calculate the shared secret key $K_s$ even if the adversary knows the values of g, P, X, and Y. Consequently, an adversary who observes the communications between client 100 and server 101 is unable to obtain the shared secret key $K_s$. Next, client 100 and server 101 are able to use this shared secret key $K_s$ to encrypt subsequent communications with each other.

A major weakness with Diffie-Hellman is that there is no authentication, which means that a computer system can unknowingly establish a secret key with an adversary. This situation can be prevented by establishing passwords between the client and server for authentication purposes. For example, the client can present its password to the server, and in response, the server can present a corresponding password to the client.

Unfortunately, the above solution to the authentication problem is vulnerable to a man-in-the-middle attack, in which an adversary sits between the client and the server on the network. To the client the adversary poses as the server, and to the server the adversary poses as the client. In this way, the adversary can authenticate itself as the client to the server by forwarding the password it received from the client to the server. The adversary can also authenticate itself as the server to the client by forwarding the corresponding password it received from the server to the client.

Hence, what is needed is a method and an apparatus that performs a secure key exchange without being vulnerable to a man-in-the-middle attack.

SUMMARY

One embodiment of the present invention provides a system that uses a password-derived prime number to facilitate a secure key exchange between a client and a server across a network. During operation, the client receives a password from a user. Next, the client uses the password to determine a prime number P associated with the password. The client then uses the prime number P to determine a generator g associated with P. The client uses this prime number to calculate $X=g^x$ mod P, wherein x is a random number generated by the client. Next, the client sends X to the server. The client also receives $Y=g^y$ mod P from the server, wherein y is a random number generated by the server. The client then computes a secret key $K_s=Y^x$ mod P at the client, which the server can similarly obtain by computing $K_s=X^y$ mod P. In this way, the client and the server can both obtain the same secret key $K_s$ through insecure communications over the network.

In a variation on this embodiment, using the password at the client to determine the prime number P involves: computing an initial candidate prime number $C_0$=f (password); and performing a search starting at $C_0$ to find P, wherein P is the first prime number following $C_0$ which is a "strong" prime number for key-exchange purposes.

In a further variation, prior to using the password to determine the prime number P, the client contacts the server and receives a SALT from the server. The client uses this SALT while computing the initial candidate prime number $C_0$=f (password, SALT).

In a variation on this embodiment, before the client receives the password from the user, the server: receives the password and uses the password to determine the prime number P associated with the password. The server then uses the prime number P to determine the generator g associated with P, and stores P and g at the server in a manner that allows P and g to be looked up based on an identifier for the user.

In a further variation, the server uses the password to determine the prime number P by first computing a random number $RAND_i$ and then computing a candidate initial prime number $C_i$ from the password and a random number, $C_i$=f (password, $RAND_i$). Next, the server performs a search starting at $C_i$ to find P, wherein P is a prime number following $C_i$ which is a "strong" prime number for key-exchange purposes. If a strong prime number P is found, the server stores P and a SALT=$RAND_i$. In this way, the server can subsequently forward the SALT to the client to reduce the time required by the client to search for P. If a strong prime number is not found in N successive numbers following $C_i$, the system repeats the process with a new random number $RAND_{i+1}$.

In a further variation, performing the search starting at $C_i$ to find P involves using a pre-computed sieve to eliminate considering multiples of prime numbers during the searching process, and determining if other numbers, which are not eliminated by the sieve, are strong prime numbers.

In a variation on this embodiment, P is a "strong" prime number with the property that P−1 has at least one large prime factor.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Client-Server System

Figure 2:
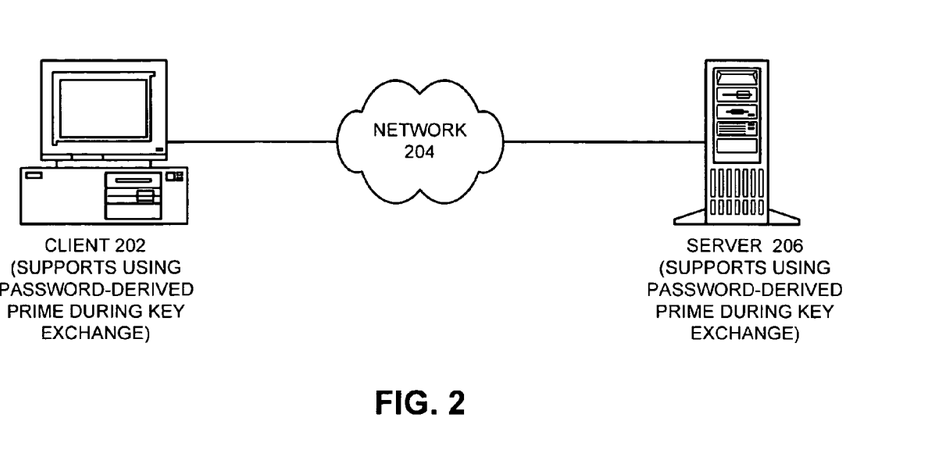
FIG. 2 illustrates a client-server system in accordance with an embodiment of the present invention.

FIG. 2 illustrates a client-server system in accordance with an embodiment of the present invention. This system includes a client 202 and a server 206, which are coupled together by a network 204.

Network 204 can generally include any type of wire or wireless communication channel capable of coupling together computing nodes. This includes, but is not limited to, a local area network, a wide area network, or a combination of networks. In one embodiment of the present invention, network 204 includes the Internet.

Client 202 can generally include any node on a network including computational capability and including a mechanism for communicating across network 204.

Server 206 can generally include any computational node including a mechanism for servicing requests from client 202 for computational and/or data storage resources.

Figure 3:
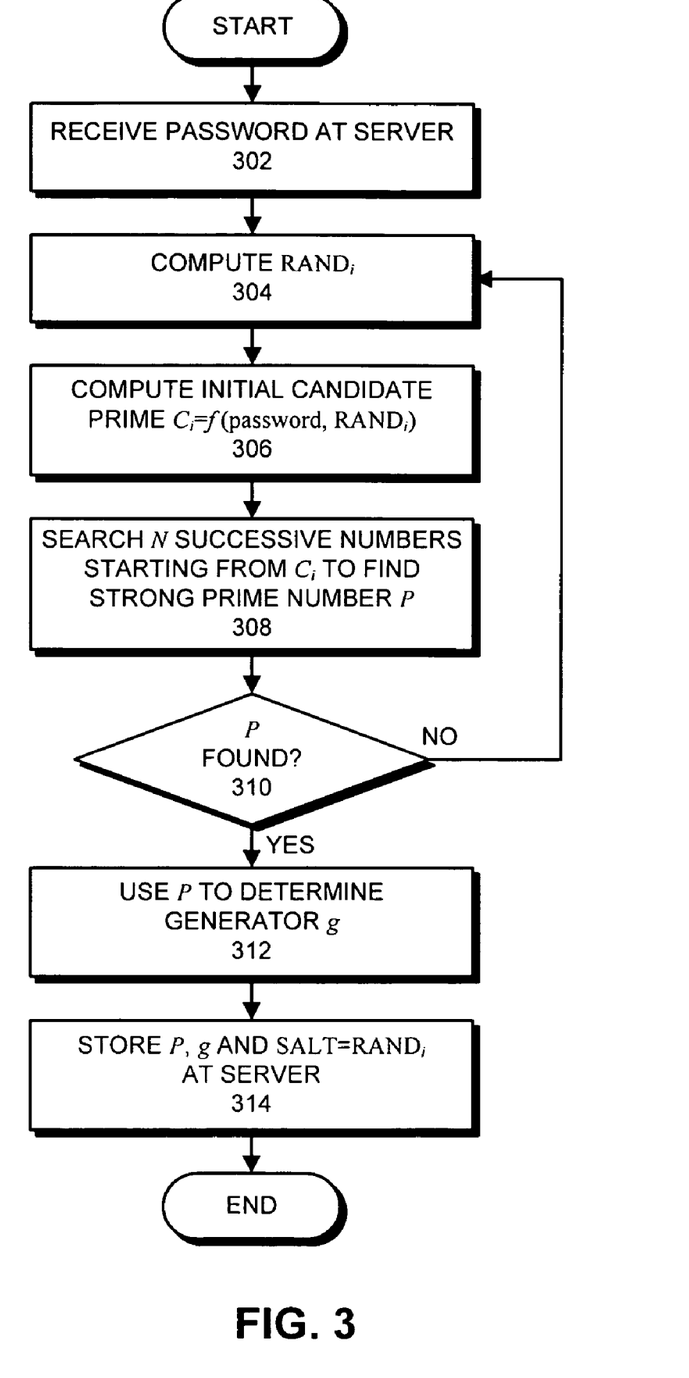
FIG. 3 presents a flow chart illustrating initialization operations performed by the server in accordance with an embodiment of the present invention.
Figure 4A:
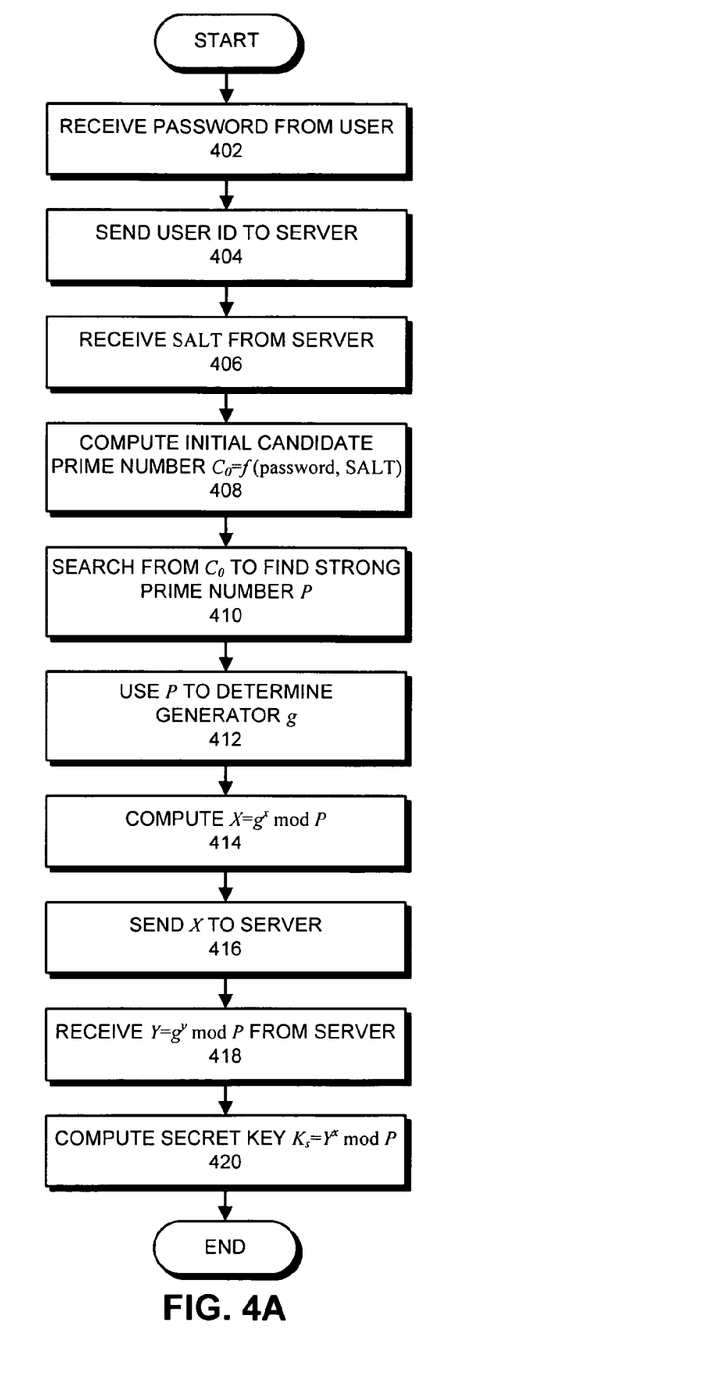
FIG. 4A illustrates the client side of a key-exchange protocol that uses a password-derived prime number in accordance with an embodiment of the present invention.
Figure 4B:
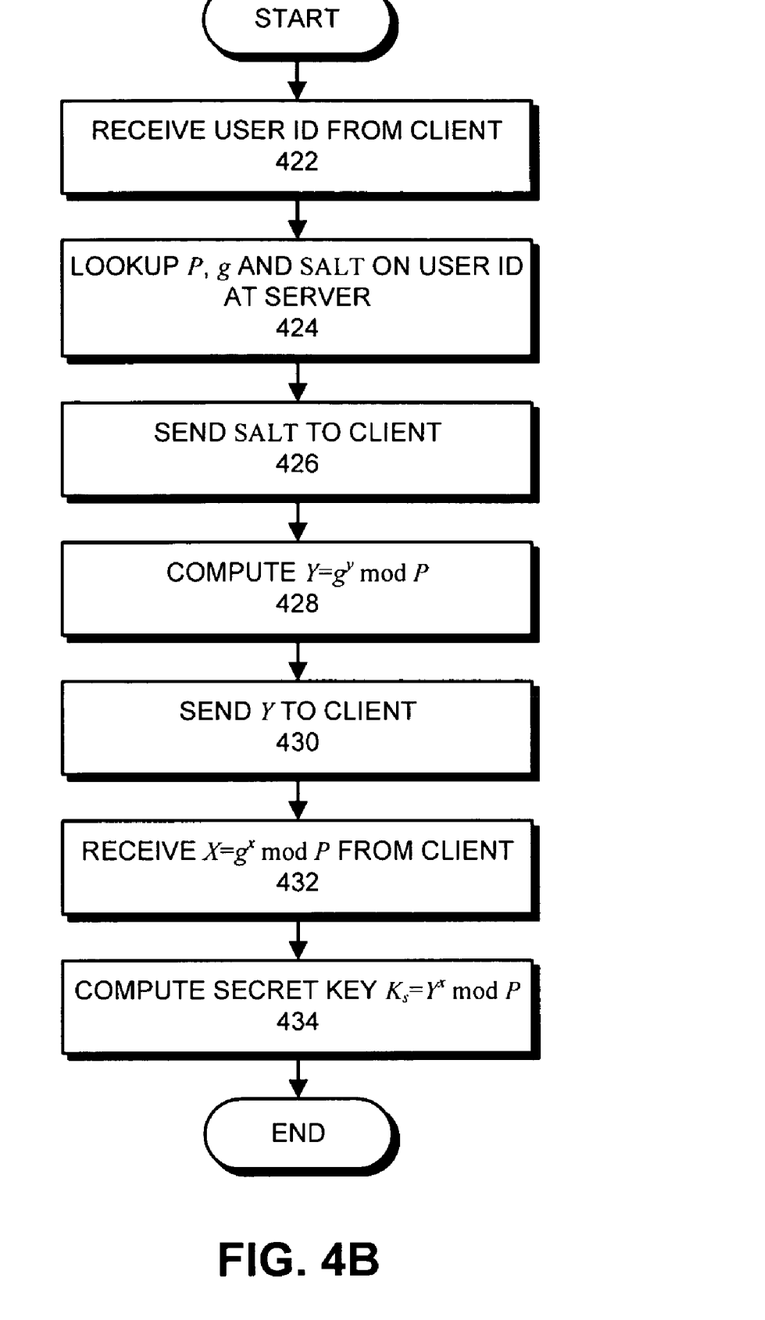
FIG. 4B illustrates the server side of a key-exchange protocol that uses a password-derived prime number in accordance with an embodiment of the present invention.

Note that client 202 and server 206 are configured to perform a key-exchange protocol using a password-derived prime number. This process described in more detail below with reference to FIG.S. 3-5.

Note that although this key-exchange protocol is described in the context of a client-server computer system, this protocol is not meant to be limited to client-server computer systems. In general, the protocol can be applied to any computational nodes, which communicate with each other through a network. Hence, the terms "client" and "server" as used in this specification (and the attached claims) generally refer to any computational nodes on a network.

Server Initialization Process

FIG. 3 presents a flow chart illustrating initialization operations performed by server 206 in accordance with an embodiment of the present invention. During these initialization operations, server 206 receives a password from a user of client 202 (step 302). Presumably, this password is communicated to server 206 using any one of a number of possible secure communication techniques.

Next, server 206 computes a random number $RAND_i$ (step 304) and the computes an initial candidate prime number $C_i$=f (password, $RAND_i$) (step 306). Next, server 206 performs a search through N successive numbers starting at $C_i$ to find a prime number P following $C_i$ which is ideally a "strong" prime number for key-exchange purposes (step 308).

A "strong" prime number P is a prime number with the property that P−1 has at least one large prime factor (for example, P−1 has a large prime factor if (P−1)/2 is prime). It is also desirable that $g^x \neq 1$ mod P unless x=0 mod p−1. (For more details on strong prime numbers, refer to {Kaufman95] "Network Security—Private Communication in a Public World," by Charlie Kaufman, Radia Perlman and Mike Spencer, Prentice-Hall 1995, page 152.)

Next, the system determines if a strong prime number P has been found (step 310). If not, the system returns to step 304 to repeat the process with a new random number $RAND_{i+1}$.

Otherwise, if a strong prime number is found, server 206 uses P to determine a generator g (step 312). (The process of determining a generator g for purposes of a key-exchange protocol is well known in the art and will not be discussed further in this specification. For more details on this process, please refer to the [Kaufman 95].)

Next, server 206 stores P, g and a SALT=$RAND_i$ in a manner that allows P, g and SALT to be looked up based on an identifier for the user (step 314). In this way, server 206 can subsequently forward the SALT to client 202 to reduce the time required by client 202 to search for P.

Client-Side Key-Exchange Protocol

FIG. 4A illustrates the client side of a key-exchange protocol which uses a password-derived prime number in accordance with an embodiment of the present invention. First, client 202 receives a password (and an associated user ID) for a user (step 402). Next, client 202 sends the user ID to server 206 (step 404). In response to sending the user ID, client 202 receives a SALT from server 206 (step 406). Client 202 then computes a candidate prime number using the SALT $C_0$=f (password, SALT) (step 408).

Client 202 then searches from $C_0$ to find a strong prime number P (step 410). Since the SALT received from server 206 was used to successfully produce a strong prime number at server 206 within N successive numbers following $C_0$, this search at client 202 will involve examining at most N successive numbers following $C_0$.

Next, client 202 uses P to determine the generator g as is discussed in more detail above with reference to step 312 of FIG. 3 (step 412).

Once P and g have been determined, the system proceeds with the conventional Diffie-Hellman key-exchange protocol. This involves computing $X=g^x$ mod P, wherein x is a random number generated by client 202 (step 414). Next, client 202 sends X to server 206 (step 416). Client 202 also receives $Y=g^y$ mod P from server 206 (step 418), wherein y is a random number generated by server 206 (step 418).

Client 202 then computes a secret key $K_s=Y^x$ mod P (step 420), which server 206 can similarly obtain by computing $K_s=X^y$ mod P. In this way, client 202 and server 206 can both obtain the same secret key $K_s$ through insecure communications over the network.

In an optimization, SALT and Y can be received from server 206 in the same message. In this case, step 418 is combined with step 406.

Server-Side Key-Exchange Protocol

FIG. 4B illustrates the server side of a key-exchange protocol that uses a password-derived prime number in accordance with an embodiment of the present invention. First, server 206 receives a user ID from client 202 (step 422). Upon receiving this user ID, server 206 uses the user ID to lookup the P, g and the SALT (which were previously computed and stored during the process described above with respect to FIG. 3) (step 424). Next, server 206 sends SALT 426 to client 202 to assist client 202 in generating the strong prime number P (step 426).

Once P and g have been obtained, the system proceeds with the conventional Diffie-Hellman key-exchange protocol. This involves computing $Y=g^y$ mod P, wherein y is a random number generated by server 206 (step 428). Next, server 206 sends Y to client 202 (step 430). Server 206 also receives $x=g^x$ mod P from client 202, wherein x is a random number generated by client 202 (step 432).

Client 202 then computes a secret key $K_s=X^y$ mod P (step 434), which client 202 can similarly obtain by computing $K_s=Y^x$ mod P. In this way, client 202 and server 206 can both obtain the same secret key $K_s$ through insecure communications over the network.

As an optimization, note that the SALT and Y can be sent to client 202 in the same message. Hence, step 426 can be deferred and combined with step 430.

Other Performance Optimizations

Note that the use of the SALT is an optional performance enhancement, which reduces the time required by client 202 to generate the strong prime number P. However, the SALT provides a method of passive attack. There is no way to get the SALT to client 202 securely (chicken-and-the-egg), hence the SALT must go in the clear. Therefore, the SALT should be chosen in such a way that a reasonably large number of candidate primes (N) must be tested prior to locating prime number P. In fact, a fixed number of primes (N) should always be tested to prevent both active and passive attacks. N should be chosen such that a reasonable percentage of dictionary attacks require a large search (for example, 5% of the dictionary).

Alternatively, N should be a function of the work required to break the discrete log protocol based as a function of the size of P ($N=f(\log P)$). In this way, N can be made to balance the work so that a dictionary attack and a discrete log attack are equal.

Another performance enhancement involves using a precomputed sieve to eliminate considering multiples of prime numbers during the searching process, and determining if other numbers, which are not eliminated by the sieve, are strong prime numbers. For example, the system can precompute all of the multiples of 2, 3, 5 and 7 from 1 to 420. (Note that 420 is divisible by 2, 3, 5 and 7.) The remaining numbers, which are not multiples of 2, 3, 5 or 7 can be stored in a bit vector (or some other type of data structure). During the searching process, the system starts at multiples of 420, and uses the bit vector to skip over the numbers which are multiples of 2, 3, 5 or 7. This technique can dramatically speed up the searching process.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using a password-derived prime number to facilitate a secure key exchange between a client and a server across a network, comprising:
   receiving a password from a user at the client;
   receiving a SALT from the server, wherein the SALT comprises a random number used as an input to a key derivation function;
   deriving a prime number P from the password and the SALT by performing a search for a first "strong" prime number following an initial candidate prime number $C_0$ wherein $C_0=f(password)$, and wherein a prime number P is a "strong" prime number when P−1 has at least one large prime factor;
   using the prime number P to determine a generator g associated with P;
   calculating $X=g^x$ mod P, wherein x is a random number generated by the client;
   sending X to the server;
   receiving $Y=g^y$ mod P from the server, wherein y is a random number generated by the server; and
   computing a secret key $K_s=Y^x$ mod P at the client, which the server similarly obtains by computing $K_s=X^y$ mod P, thereby allowing the client and the server to both obtain the same secret key $K_s$ through insecure communications over the network.

2. The method of claim 1,
   wherein, at the client, computing the initial candidate prime number $C_0$ from the password and the SALT involves computing $C_0=f(password, SALT)$.

3. The method of claim 1, wherein prior to receiving the password from the user, the method further comprises:
   communicating the password securely to the server;
   at the server, using the password to determine the "strong" prime number P associated with the password;
   at the server, using the "strong" prime number P to determine the generator g associated with P; and
   storing P and g at the server in a manner that allows P and g to be looked up based on an identifier for the user.

4. The method of claim 3, wherein, at the server, deriving the prime number P from the received password involves repeatedly:
   computing a random number RAND;
   computing a candidate initial prime number $C_i$ from the password and a random number, $C_i=f(password, RAND_i)$;
   performing a search starting at $C_i$ to find P, wherein P is a prime number following $C_i$ which is a "strong" prime number for key-exchange purposes;
   if a strong prime number P is found, storing P and a $SALT=RAND_i$, at the server, whereby the SALT can be subsequently forwarded to the client to reduce the time required to search for P at the client; and if a strong prime number is not found in N successive numbers following $C_i$, the method further comprises repeating the process with a new random number $RAND_{i+1}$.

5. The method of claim 4, wherein performing the search starting at $C_i$ to find P involves:
   using a pre-computed sieve to eliminate considering multiples of prime numbers during the searching process; and
   determining if other numbers, which are not eliminated by the sieve, are strong prime numbers.

6. A computer-readable storage medium storing instructions that when executed by a computer cause the computer to perform a method for using a password-derived prime number to facilitate a secure key exchange between a client and a server across a network, the method comprising:
   receiving a password from a user at the client;
   receiving a SALT from the server, wherein the SALT comprises a random number used as an input to a key derivation function;
   deriving a prime number P from the password and the SALT by performing a search for a first "strong" prime number following an initial candidate prime number $C_0$, wherein $C_0=f(password)$, and wherein the prime number P is a "strong" prime number when P−1 has at least one large prime factor;
   using the prime number P to determine a generator g associated with P;
   calculating $X=g^x$ mod P, wherein x is a random number generated by the client;
   sending X to the server;
   receiving $Y=g^y$ mod P from the server, wherein y is a random number generated by the server; and
   computing a secret key $K_s=Y^x$ mod p at the client, which the server similarly obtains by computing $K_s=X^y$ mod p, thereby allowing the client and the server to both obtain the same secret key $K_s$ through insecure communications over the network.

7. The computer-readable storage medium of claim 6, wherein, at the client, computing the initial candidate prime number $C_0$ from the password and the SALT involves computing $C_0=f(password, SALT)$.

8. The computer-readable storage medium of claim 6, wherein prior to receiving the password from the user, the method further comprises:
   communicating the password securely to the server;
   at the server, using the password to determine the "strong" prime number P associated with the password;
   at the server, using the "strong" prime number P to determine the generator g associated with P; and
   storing P and g at the server in a manner that allows P and g to be looked up based on an identifier for the user.

9. The computer-readable storage medium of claim 8, wherein, at the server, deriving the prime number P from the received password involves repeatedly:
   computing a random number $RAND_i$;
   computing a candidate initial prime number $C_i$ from the password and a random number, $C_i=f(password, RAND_i)$;
   performing a search starting at $C_i$ to find P, wherein P is a prime number following $C_i$ which is a "strong" prime number for key-exchange purposes;
   if a strong prime number P is found, storing P and a SALT=$RAND_i$, at the server, whereby the SALT can be subsequently forwarded to the client to reduce the time required to search for P at the client; and
   if a strong prime number is not found in N successive numbers following $C_i$, the method further comprises repeating the process with a new random number $RAND_{i+1}$.

10. The computer-readable storage medium of claim 9, wherein performing the search starting at $C_i$ to find P involves:
    using a pre-computed sieve to eliminate considering multiples of prime numbers during the searching process; and
    determining if other numbers, which are not eliminated by the sieve, are strong prime numbers.

11. A client device that uses a password-derived prime number to facilitate a secure key exchange between the client device and a server across a network, comprising:
    a processor;
    a memory;
    a receiving mechanism implemented in the client device and configured to receive a password from a user;
    a communication mechanism implemented in the client device and configured to receive a SALT from the server, wherein the SALT comprises a random number used as an input to a key deviation function;
    a prime number determination mechanism implemented in the client device and configured to derive a prime number P from the password and the SALT by performing a search for a first "strong" prime number following an initial candidate prime number $C_0$, wherein $C_0=f(password)$, and wherein a prime number P is a "strong" prime number when P−1 has at least one large prime factor;
    a generator determination mechanism implemented in the client device and configured to use the prime number P to determine a generator g associated with P for the purposes of generating a key; and
    a key generation mechanism implemented in the client device and configured to,
        calculate $X=g^x$ mod P, wherein x is a random number generated by the client,
        send X to the server,
        receive $Y=g^y$ mod P from the server, wherein y is a random number generated by the server, and to
        compute a secret key $K_s=Y^x$ mod p at the client, which the server similarly obtains by computing $K_s=X^y$ mod p, thereby allowing the client and the server to both obtain the same secret key $K_s$ through insecure communications over the network.

12. The client device of claim 11, wherein the prime number determination mechanism at the client is configured to compute the initial candidate prime number $C_0$ from the password and the SALT by computing $C_0=f(password, SALT)$.

13. The client device of claim 11, further comprising:
    a prime number determination mechanism at the server;
    wherein during an initialization phase, the prime number determination mechanism at the server is configured to,
    receive the password,
        use the password to determine the "strong" prime number P associated with the password,
        use the "strong" prime number P to determine the generator g associated with P, and to
        store P and g at the server in a manner that allows P and g to be looked up based on an identifier for the user.

14. The client device of claim 13, wherein the prime number determination mechanism at the server is configured to repeatedly:

compute a random number $RAND_i$;

compute a candidate initial prime number $C_i$ from the password and a random number, $C_i = f(password, RAND_i)$;

perform a search starting at $C_i$ to find P, wherein P is a prime number following $C_i$ which is a "strong" prime number for key-exchange purposes;

if a strong prime number P is found, to store P and a SALT=$RAND_i$ at the server, whereby the SALT can be subsequently forwarded to the client to reduce the time required to search for P at the client; and if a strong prime number is not found in N successive numbers following $C_i$, to repeat the process with a new random number $RAND_{i+1}$.

15. The client device of claim 14, wherein while performing the search starting at $C_i$ to find P, the prime number determination mechanism at the server is configured to:

use a pre-computed sieve to eliminate considering multiples of prime numbers during the searching process; and to determine if other numbers, which are not eliminated by the sieve, are strong prime numbers.

* * * * *

UNITED STATES PATENT AND TRADEMARK OFFICE
CERTIFICATE OF CORRECTION

| | | |
|---|---|---|
| PATENT NO. | : 7,764,795 B2 | Page 1 of 1 |
| APPLICATION NO. | : 10/970316 | |
| DATED | : July 27, 2010 | |
| INVENTOR(S) | : Andrew B. Philips | |

It is certified that error appears in the above-identified patent and that said Letters Patent is hereby corrected as shown below:

Title page, item (56), in column 2, line 1, delete "Authenticatio" and insert -- Authentication --, therefor.

In column 6, line 56, in claim 4, delete "RAND;" and insert -- $RAND_i$; --, therefor.

In column 6, line 65, in claim 4, delete "SALT=$RAND_i$," and insert -- SALT=$RAND_i$ --, therefor.

In column 7, line 65, in claim 9, delete "SALT=$RAND_i$," and insert -- SALT=$RAND_i$ --, therefor.

Signed and Sealed this
Tenth Day of May, 2011

David J. Kappos
*Director of the United States Patent and Trademark Office*